United States Patent
Inoue

(10) Patent No.: US 7,953,283 B2
(45) Date of Patent: May 31, 2011

(54) PORTABLE TERMINAL

(75) Inventor: Akihiko Inoue, Fukuoka (JP)

(73) Assignee: Panasonic Corporation, Osaka (JP)

( * ) Notice: Subject to any disclaimer, the term of this patent is extended or adjusted under 35 U.S.C. 154(b) by 994 days.

(21) Appl. No.: 11/794,917

(22) PCT Filed: Jan. 16, 2006

(86) PCT No.: PCT/JP2006/300912
§ 371 (c)(1),
(2), (4) Date: Jul. 9, 2007

(87) PCT Pub. No.: WO2006/080261
PCT Pub. Date: Aug. 3, 2006

(65) Prior Publication Data
US 2008/0144949 A1 Jun. 19, 2008

(30) Foreign Application Priority Data

Jan. 27, 2005 (JP) ................. 2005-019402

(51) Int. Cl.
*G06K 9/36* (2006.01)
*G06K 9/46* (2006.01)
(52) U.S. Cl. .......................................... 382/233
(58) Field of Classification Search .............. 382/141,
382/145, 232, 233, 236, 238, 251, 305; 348/229.1,
348/230, 298, 492, 496, E11.001; 375/130,
375/133, 239, 240.17, E7.113, E7.14, E7.179;
235/455, 462.01, 472.01; 455/69, 522
See application file for complete search history.

(56) References Cited

U.S. PATENT DOCUMENTS

| 5,811,774 A * | 9/1998 | Ju et al. .......................... 235/455 |
| 5,815,200 A * | 9/1998 | Ju et al. ...................... 348/229.1 |
| 6,295,376 B1 * | 9/2001 | Nakaya .......................... 382/236 |

(Continued)

FOREIGN PATENT DOCUMENTS

EP 1 185 104 3/2002

(Continued)

OTHER PUBLICATIONS

Jongsun Park et al., "A Low Power Reconfigurable DCT Architecture to Trade Off Image Quality for Computational Complexity", Acoustics, Speech, and Signal Processing, 2004 Proceedings, (ICASSP '04), IEEE International Conference on Montreal, Quebec, Canada May 17-21, 2004, Piscataway, NJ, USA, IEEE, vol. 5, May 17, 2004, pp. 17-20.

(Continued)

*Primary Examiner* — Amir Alavi
(74) *Attorney, Agent, or Firm* — Wenderoth, Lind & Ponack, L.L.P.

(57) ABSTRACT

A portable terminal including an input unit (1001), through which images are entered, an encoding unit (1002) operable to encode the input images, thereby providing encoded data, a transmitting unit (1003) operable to transmit the encoded data to a communication counterpart, a receiving unit (1006) operable to receive communication counterpart-related information from the communication counterpart, and a mode-determining unit operable to determine an encoding method. The mode-determining unit receives the information on each of the self-terminal and the communication counterpart, thereby providing the determined encoding method. As a result, even when each of the self-terminal and the communication counterpart retains a sufficient level of remaining battery power, the encoding method is properly changed to suppress unwanted power consumption, whereby communication between the self-terminal and the communication counterpart can be made for a longer period of time.

8 Claims, 8 Drawing Sheets

U.S. PATENT DOCUMENTS

| | | | |
|---|---|---|---|
| 6,310,906 B1 * | 10/2001 | Abarbanel et al. | 375/130 |
| 6,717,434 B2 * | 4/2004 | Takahashi et al. | 326/37 |
| 6,748,005 B1 * | 6/2004 | Riazi et al. | 375/133 |
| 6,868,256 B2 * | 3/2005 | Dooley et al. | 455/41.1 |
| 6,898,417 B1 * | 5/2005 | Moulsley | 455/69 |
| 2008/0144949 A1 * | 6/2008 | Inoue | 382/233 |

FOREIGN PATENT DOCUMENTS

| | | |
|---|---|---|
| JP | 8-9347 | 1/1996 |
| JP | 2000-341222 | 12/2000 |
| JP | 2001-57670 | 2/2001 |

OTHER PUBLICATIONS

Wei Yu et al., "Energy Efficient JPEG 2000 Image Transmission over Wireless Sensor Networks", Global Telecommunications Conference, 2004, Globecom '04, IEEE Dallas, TX, USA Nov. 29-Dec. 3, 2004, Piscataway, NJ, USA, IEEE, Nov. 29, 2004, pp. 2738-2743.

Amit Sinha et al., "Algorithmic Transforms for Efficient Energy Scalable Computation", Low Power Electronics and Design, 2000, ISPLPED '00, Proceedings of the 2000 International Symposium on Jul. 26-27, 2000, Piscataway, NJ, USA, IEEE, Jul. 26, 2000, pp. 31-36.

* cited by examiner

Fig. 5(a)

| | change of encoding method | |
|---|---|---|
| CPU capability of self-terminal | CPU capability of communication counterpart | |
| | high | low |
| high | MPEG-4 AVC | H.263 |
| low | H.263 | H.263 |

Fig. 5(b)

| | change of encoding tool (in case of MPEG-4 AVC) | |
|---|---|---|
| CPU capability of self-terminal | image quality request from communication counterpart | |
| | high | low |
| high | loop filter ON | loop filter OFF |
| low | loop filter OFF | loop filter OFF |

Fig. 5(c)

| | change of encoding tool (in case of MPEG-4 AVC) | |
|---|---|---|
| CPU capability of self-terminal | remaining battery power of communication counterpart | |
| | high | low |
| high | loop filter ON | loop filter OFF |
| low | loop filter OFF | loop filter OFF |

Fig. 7(a)

| Mode | Power | | Quality |
|---|---|---|---|
| | Encoding | Decoding | |
| #1 | 300 | 200 | XP |
| #2 | 50 | 250 | LP |
| #3 | 250 | 50 | LP |
| #4 | 30 | 100 | SP |

Fig. 7(b)

| Pattern | Total |
|---|---|
| #1, #1 | 1000 |
| #1, #2 | 800 |
| #1, #3 | 800 |
| #1, #4 | 630 |
| #2, #2 | 600 |
| #2, #3 | 600 |
| #3, #3 | 600 |
| #2, #4 | 430 |
| #3, #4 | 430 |
| #4, #4 | 260 |

PORTABLE TERMINAL

This application is a 371 of PCT/JP2006/300912, filed on 16 Jan. 2006.

TECHNICAL FIELD

The present invention relates to a portable terminal having a data-compressing/decompressing device disposed therein to allow images and voices to be received and transmitted between remote locations.

BACKGROUND ART

An art operable to compress data such as images and voices is lately of significant importance to enrich our daily lives.

The current handheld terminal allows for a video-phone call between remote locations. The use of a pair of videophones allows moving images to be transmitted therebetween in synchronism with voices, whereby richly expressive communication is achievable when compared with the past handheld terminals. Each of the videophones is provided with a radio transmission channel. The radio transmission channel has the current transmission speed of 64 kbps (bit per second). In future, a transmission speed as fast as some 2 Mbps is probably achievable. To provide improved quality of each image transmitted at relatively lower speed, a moving image-transmitting art is important, and a moving image-compressing/encoding art is of particular importance.

A variety of proposals have been made to provide the moving image-encoding art. The standard specification of the image-compressing art includes H.261 and H.263 according to ITU-T (the ITU Telecommunication Standardization Sector), and MPEG-1, MPEG-2, and MPEG-4 (MPEG is short for the Moving Picture Experts Group) according to ISO (the International Organization for Standardization). H.264 (or MPEG-4 Advanced Profile) is a standardized next-generation encoding art provided by ITU-T jointly with ISO.

In general, to provide an increased compression ratio, a calculation quantity during the image encoding is required. For example, when a moving image is compressed in accordance with the MPEG-4 Advanced Profile (hereinafter called a MPEG-4 AVC), a compression ratio is improved twice as high as that according to MPEG-4 Simple Profile (hereinafter called a MPEG-4 SP), provided that image quality according to the MPEG-4 AVC is substantially similar to that according to the MPEG-4 SP. At the same time, the calculation quantity according to the MPEG-4 AVC is more than twice as large as that according to the MPEG-4 SP. More specifically, under a fixed transmission rate, the MPEG-4 AVC is better in image quality than the MPEG-4 SP, but is greater in portable terminal processing amount than the MPEG-4 SP. As a result, the MPEG-4 AVC is greater in power consumption than the MPEG-4 SP. The MPEG-4 AVC includes a large number of encoding tools, and both of the image quality and the portable terminal power consumption are considerably varied, depending upon selected one of the encoding tools during the image encoding. For example, a loop filter providing a greater processing amount but better image quality is selectively executable during the image encoding.

In portable terminal-based communication, a reduction in power consumption is of significant importance. In particular, a battery consumes a significant amount of electrical power to transmit and receive moving images because there is a need for a data quantity greater than a voice quantity as well as a need for a considerable amount of processing to compress and decompress the moving images.

Assuming that a communication counterpart is an underqualified terminal, there are cases where such a terminal fails to decode received data when the data transmitted from the self-terminal to the communication counterpart has been encoded in accordance with an encoding method that involves a large amount of processing.

Referring to FIG. 12, an art disclosed by cited Reference No. 1 (published Japanese Patent Application Laid-Open No. 2000-341222) is illustrated. According to the disclosed art, the remaining battery power of the communication counterpart is monitored to change the encoding method in accordance with a status of the communication counterpart. The following discusses the disclosed art of cited Reference No. 1 with reference to FIGS. 12 and 13.

In FIG. 12, a portable terminal includes a remaining battery power-detecting unit 1409, a control unit 1408, and a radio communication unit 1405. The remaining battery power-detecting unit 1409 detects the remaining battery power of the portable terminal. The detected remaining battery power is fed into the control unit 1408. The control unit 1408 compares the remaining battery power with a threshold. As illustrated in FIG. 13, the radio communication unit 1405 addresses an encoding method-changing request to a communication counterpart of the portable terminal when the remaining battery power is equal to or less than the predetermined threshold.

The host apparatus includes a radio communication unit 1403, a control unit 1404, an encoding unit 1402, and an input unit 1401. When the radio communication unit 1403 receives the encoding method-changing request, then the control unit 1404 sends out control information to the encoding unit 1402. The control information requests the encoding unit 1402 to change the encoding method in mode to another mode in which the portable terminal consumes reduced electrical power to decode the data.

The encoding unit 1402 encodes the input data entering through the input unit 1401 in accordance with the instructions from the control unit 1404, thereby providing encoded data. The encoded data is sent out to the portable terminal through the radio communication unit 1403.

FIG. 13 illustrates a flow of data. As illustrated in FIG. 13, the host apparatus 1501 in the course of transmitting the encoded data at a high-bit rate is driven to switch over the encoded data from the current high-bit rate to a lower bit rate in response to a signal indicative of the encoding method-changing request from the portable terminal 1502.

Another art is disclosed in cited Reference No. 2 (published Japanese Patent Application Laid-Open No. 1994-140332). According the disclosed art, a communication rate is calculated based on the remaining battery power to compare the calculated communication rate with a communication rate of the communication counterpart, thereby selecting a smaller communication rate.

A further art is disclosed in cited Reference No. 3 (published Japanese Patent Application Laid-Open No. 1999-232071). According to the disclosed art, fewer receivable and transmittable objects are provided in accordance with the remaining battery power.

However, each of the above arts according to cited References 1-3 merely takes account of a countermeasure that portable terminals at opposite ends of communication are controlled to be mutually rendered durable as long term as possible in response to a reduction in remaining battery power in each of the portable terminals. More specifically, the intention of a user of each of the portable terminals cannot be reflected in communication control.

For example, assume that each of the users of the portable terminals thinks that communication in a standard or low quality image mode is satisfactory without the need for a high-quality image mode. However, the user can select neither a reduced power consumption-involving encoding method nor a reduced power consumption-involving decoding method.

In particular, even when the current remaining battery power is sufficient, it is impossible to postpone, as long term as possible, a stage at which the remaining battery power becomes insufficient. As a result, communication capability operable for a longer period of time is unavailable.

In view of the above, an object of the present invention is to provide a portable terminal operable to rationally determine an encoding method and/or a decoding method, and operable to communicate for a further longer period of time.

DISCLOSURE OF THE INVENTION

A first aspect of the present invention provides a portable terminal including an input unit, through which an image is entered, an encoding unit operable to encode the image in accordance with either one of a plurality of encoding methods, thereby generating data, a transmitting unit operable to transmit the data to a communication counterpart, a receiving unit operable to receive both image quality request information and encoded data from the communication counterpart, a decoding unit operable to decode the encoded data in accordance with either one of a plurality of decoding methods, thereby providing a generated image, an output unit, through which the generated image is provided, and a mode-determining unit operable to determine either one from among the plurality of encoding methods in accordance with the image quality request information so as to provide reduced power consumption, thereby providing a determined encoding method, whereby the encoding unit encodes the image in accordance with the determined encoding method. In the portable terminal, the mode-determining unit determines either one from among the plurality of decoding methods in accordance with the image quality request information so as to provide reduced power consumption, thereby providing a determined decoding method, whereby the decoding unit decodes the encoded data in accordance with the determined decoding method.

The above structure allows the mode-determining unit to select an encoding method and/or a decoding method, each of which provides as less power consumption as possible, within the range of satisfying image quality indicated by the image quality request information, even with a sufficient level of remaining battery power of each of a portable terminal and its communication counterpart. As a result, power consumption in each of the portable terminals is suppressed to allow for communication therebetween for a longer period of time.

A second aspect of the present invention provides a portable terminal as defined in the first aspect of the present invention, in which the transmitting unit transmits system information to a communication counterpart, in which the system information is indicative of remaining battery power of the portable terminal, while the receiving unit receives system information from the communication counterpart, in which the system information is indicative of remaining battery power of the communication counterpart. In the portable terminal, when a magnitude relationship of the remaining battery power between the portable terminal and the communication counterpart is reversed, the mode-determining unit changes at least one of the encoding method for the encoding unit and the decoding method for the decoding unit so as to provide reduced power consumption in either one of the portable terminal and the communication counterpart, whichever is smaller in remaining battery power.

The above structure allows the remaining battery power to be mutually checked to see between the self-terminal and the communication counterpart. When the magnitude relationship of the remaining battery power between the self-terminal and the communication counterpart is reversed, then the encoding method and/or the decoding method are changed, whereby a burden of electrical power is imposed more flexibly on each of the self-terminal and the communication counterpart. More specifically, a lighter burden of the electrical power is imposed on either one of the self-terminal and the communication counterpart, whichever is smaller in remaining battery power. As a result, communication between the self-terminal and the communication counterpart can be made totally for a long period of time.

A third aspect of the present invention provides a portable terminal as defined in the first aspect of the present invention, in which the mode-determining unit determines each of the encoding method for the encoding unit and the decoding method for the decoding unit, with reference to a sum of power consumption of the portable terminal and power consumption in the communication counterpart, so as to allow the sum to be as small as possible.

The above structure focuses on a sum of power consumption values, thereby rationally distributing power consumption.

A fourth aspect of the present invention provides a portable terminal as defined in the first aspect of the present invention, in which the image quality request information shows high, standard, and low levels of image quality.

The above structure uses at least three different types of image quality in combination with power consumption required by each of these image quality types, thereby rationally distributing the power consumption.

A fifth aspect of the present invention provides a portable terminal as defined in the first aspect of the present invention, in which the mode-determining unit determines a change in encoding method for the encoding unit, and when the encoding unit is encoding the image, the mode-determining unit delays the change in encoding method for the encoding unit until the encoding unit completes encoding the image.

A sixth aspect of the present invention provides a portable terminal as defined in the first aspect of the present invention, in which the mode-determining unit determines a change in decoding method for the decoding unit, and when the decoding unit is decoding the encoded data, the mode-determining unit delays the change in decoding method for the decoding unit until the decoding unit completes decoding the encoded data.

The above two structures provide a smooth switchover of the encoding method and/or the decoding method without allowing users to feel odd.

Pursuant to the present invention, even when a sufficient level of remaining battery power is retained in each of the self-terminal and the communication counterpart, each of the portable terminals according to the present invention determines the encoding method and/or the decoding method in accordance with user's intention reflected by each of the portable terminals according to the present invention, thereby providing rationally reduced power consumption. As a result, communication between the portable terminals can be made for a long period of time.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5(a) is a descriptive illustration showing one type of an encoding method switchover table according to the first embodiment;

FIG. 5(b) is a descriptive illustration showing another type of an encoding method switchover table according to the first embodiment;

FIG. 5(c) is a descriptive illustration showing a further type of an encoding method switchover table according to the first embodiment;

FIG. 7(a) is a descriptive illustration showing part of a mode table according to the fourth embodiment;

FIG. 7(b) is a descriptive illustration showing a further part of the mode table according to the fourth embodiment;

BEST MODE FOR CARRYING OUT THE INVENTION

Embodiments of the present invention are now described with reference to the accompanying drawings. In each of the embodiments as described below, a portable terminal except for output and input units thereof can be configured as a single or otherwise a plurality of semiconductor integrated circuits.

First Embodiment

To provide the simplified description, a first embodiment is premised on that moving images are distributed between two portable terminals.

Figure 1:
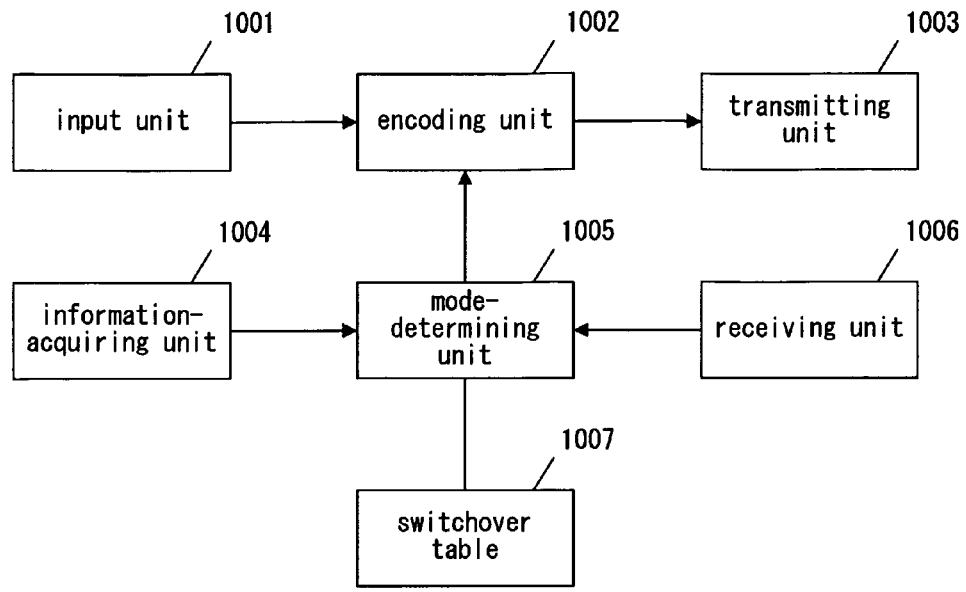
FIG. 1 is a block diagram illustrating a portable terminal according to a first embodiment of the present invention.

FIG. 1 is a block diagram illustrating each of the portable terminals. In FIG. 1, an input unit 1001 is operable to take in input images through a camera or a recoding medium.

An encoding unit 1002 is operable to compress each of the taken input images in accordance with any one of a plurality of encoding methods such as H. 263 and MPEG-4 in combination with a proper encoding tool, thereby generating encoded image data. The encoding method and tool to be used by the encoding unit 1002 are determined by a control signal from a mode-determining unit 1005. The encoding unit 1002 includes an On/OFF-controllable loop filter.

A transmitting unit 1003 is operable to multiplex the encoded image data compressed by the encoding unit 1002, together with compressed voice data, thereby transmitting the multiplexed image and voice data to the outside or a communication counterpart.

A receiving unit 1006 is operable to receive system information from the communication counterpart. The received system information includes communication counterpart-related information such as remaining battery power, requested image quality, incoming signal strength, and CPU capability. The system information as received by the receiving unit 1006 is contained, e.g., by each packet at the header thereof, or otherwise by each moving image in stream data thereof.

An information-acquiring unit 1004 is operable to acquire self-terminal system information. The system information includes self-terminal-related information such as remaining battery power, requested image quality, incoming signal strength, and CPU capability. The system information as transmitted by the transmitting unit 1003 is contained, e.g., by each packet at the header thereof, or otherwise by each moving image in stream data thereof.

The mode-determining unit 1005 receives the self-terminal system information from the information-acquiring unit 1004 and the communication counterpart system information from the receiving unit 1006. The mode-determining unit 1005 is operable to determine an encoding method to be used, from among the plurality of encoding methods in accordance with the received self-terminal system information and communication counterpart system information. A switchover table 1007 is discussed in detail later.

Figure 4:
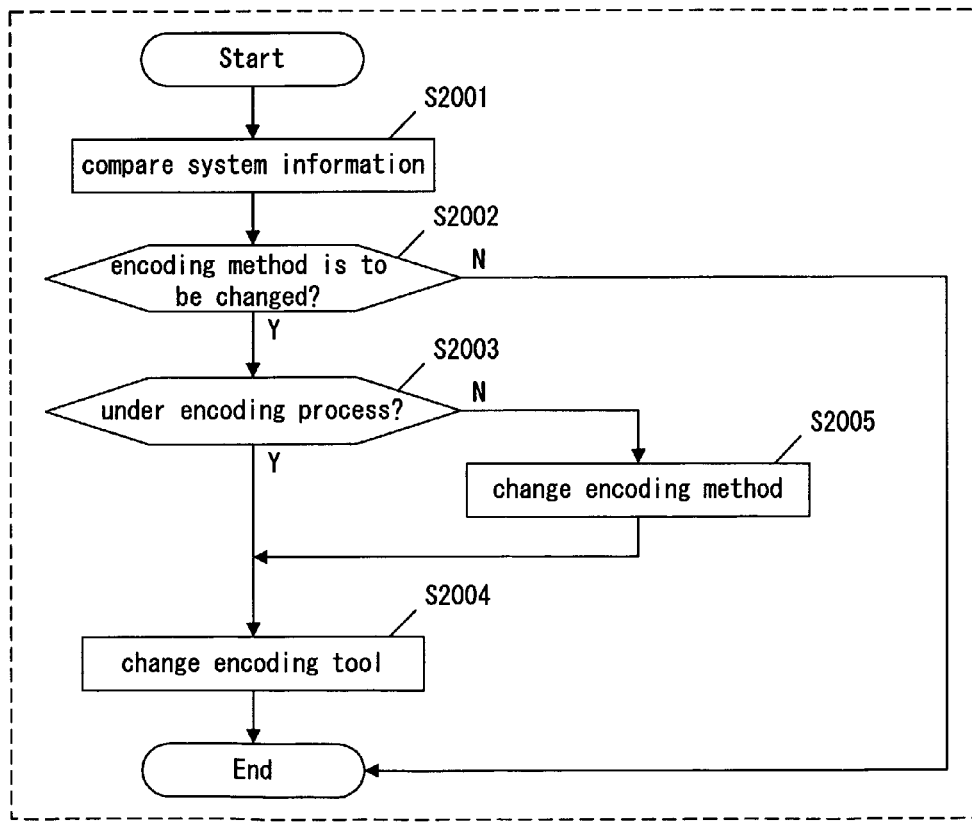
FIG. 4 is a flowchart illustrating a course of action provided by a mode-determining unit according to the first embodiment.

The following discusses, with reference to FIG. 4, the way of determining the encoding method. At initial step 2001, the mode-determining unit 1005 compares the self-terminal system information from the information-acquiring unit 1004 with the communication counterpart system information from the receiving unit 1006 with reference to the switchover table 1007 of FIG. 5.

FIG. 5(a) exemplifies the switchover table 1007 based on the CPU capability of each of the portable terminals for use in a switchover among the encoding methods. The CPU capability is quantified in advance in accordance with, e.g., operating frequency, and is thereby classified into predetermined levels. Pursuant to the present embodiment, to provide the simplified description, the CPU capability is classified into two different levels of "High" and "Low". Alternatively, the CPU capability may be classified into three or greater different levels.

According to the switchover table 1007 of FIG. 5(a), when the self-terminal differs in CPU capability from the communication counterpart by levels, the mode-determining unit 1005 determines an encoding method based on the low level of the CPU capability. For example, when the communication counterpart is lower in CPU capability than the self-terminal, the mode-determining unit 1005 selects the H.263 as an encoding method to be used, although the H.263 is considerably smaller in processing amount than the MPEG-4 AVC, even when the CPU capability of the self-terminal is sufficient to handle the MPEG-4 AVC.

FIG. 5(b) exemplifies a switchover table 1007 based on both an image quality request from the communication counterpart and the CPU capability of the self-terminal for use in a switchover among the encoding tools. Similar to the CPU capability, the image quality is quantized and pre-classified into predetermined levels. FIG. 5(b) is premised on that the encoding method is the MPEG-4 AVC. When the image quality request from the communication counterpart is low, the mode-determining unit 1005 switches off the selectively executable loop filter to reduce a processing amount (power consumption) during each of the encoding and decoding processes, instead of degrading the image quality.

When the CPU capability of the self-terminal is less than a predetermined level, the mode-determining unit 1005 switches off the loop filter to encode images, even when the image quality request from the communication counterpart is high in level. As a result, a collapse of the encoding process is prevented.

Similar to FIG. 5(b), FIG. 5(c) exemplifies a switchover table 1007 based on the remaining battery power of the communication counterpart and the CPU capability of the self-terminal for use in a switchover among the encoding tools. According to FIG. 5(c), when the remaining battery power of the communication counterpart is small in level, the mode-determining unit 1005 switches off the loop filter. As a result, there are provided reduced power consumption in the communication counterpart during the decoding process and reduced power consumption in the self-terminal during the encoding process.

Similar to FIG. 5(b), when the CPU capability of the self-terminal is low, the mode-determining unit 1005 switches off the loop filter to encode images, even when the remaining battery power of the communication counterpart is great in level. As a result, a collapse of the encoding process is prevented.

When an encoding method is determined with concurrent reference to the image quality request and remaining battery power according to the system information on the communication counterpart, there are cases where the only one encoding method is undetermined.

The following discusses such an undetermined event with reference to FIG. 5(b) and FIG. 5(c).

Assuming that the CPU capability of the self-terminal is high, and that the remaining battery power of the communication counterpart is great, then the loop filter is switched on in accordance with the switchover table 1007 of FIG. 5(c). However, assuming that the CPU capability of the self-terminal is high, but that the image quality request from the communication counterpart is low, then the loop filter is switched off in accordance with the switchover table 1007 of FIG. 5(b).

Assuming that the CPU capability of the self-terminal is sufficiently high, and that the remaining battery power of the communication counterpart is high, but that the image quality request from the communication counterpart is low, then a discrepancy occurs in determining the encoding method. In this instance, to avoid wasting power consumption, the mode-determining unit 1005 switches off the loop filter to determine the encoding method. In other words, when a discrepancy occurs in the switchover table 1007, then the mode-determining unit 1005 determines the encoding method so as to provide lower power consumption.

Referring now to FIG. 4, when the comparison in step 2001 is completed, then at step 2002, the mode-determining unit 1005 determines whether the encoding method is to be changed. To make the determination, the mode-determining unit 1005 compares a result from the reference to the switchover table 1007 with an immediately previous encoding method. When determining as a result of the comparison that the encoding method is to be changed, then the mode-determining unit 1005 advances the current processing to step 2003, but terminates the current processing without transmitting a signal to the encoding unit 1002 when the mode-determining unit 1005 determines as a result of the comparison that the encoding method must remain unchanged.

When it is determined in step 2002 that the encoding method is to be changed, then at step 2003 the mode-determining unit 1005 determines whether the encoding unit 1002 is under the encoding process. When the determination in step 2003 results in "NO", then at step 2005 the mode-determining unit 1005 changes the encoding method. At step 2004, the mode-determining unit 1005 changes the encoding tool.

When the determination in step 2003 results in "YES", then images are temporarily aggravated when the encoding method such as the H. 263 and the MPEG-4 is changed. Thus, users feel odd. In this instance, at step 2004, the mode-determining unit 1005 changes only the encoding tool. The encoding tool can be changed for each frame or otherwise for each macro block, thereby delaying a change in encoding method. Thereafter, when the encoding unit 1002 completes the encoding process, the current processing is advanced from step 2003 to step 2005, at which the encoding method for the encoding unit 1002 is actually changed.

The change in encoding tool according to the present embodiment is to switch over the loop filter between ON and OFF, or alternatively may include the step of restricting a predictive mode, whereby a direct mode is excluded, the step of restricting a macro block size, whereby only a horizontal 16-pixel by vertical 16-pixel macro block is acceptable, and the step of deleting local decoding process, which is premised on periodical insertion of intra frames.

Although the present embodiment describes the way in which the portable terminal automatically acquires the system information, alternatively users may enter the system information into the portable terminal in accordance with, e.g., operating menus.

Pursuant to the present embodiment, the mode-determining unit 1005 determines the encoding method in accordance with the system information on each of the self-terminal and its communication counterpart, and the encoding method is determined in light of a status of each of the portable terminals, whereby reduced power consumption in each of the portable terminals is achievable.

Second Embodiment

Figure 2:
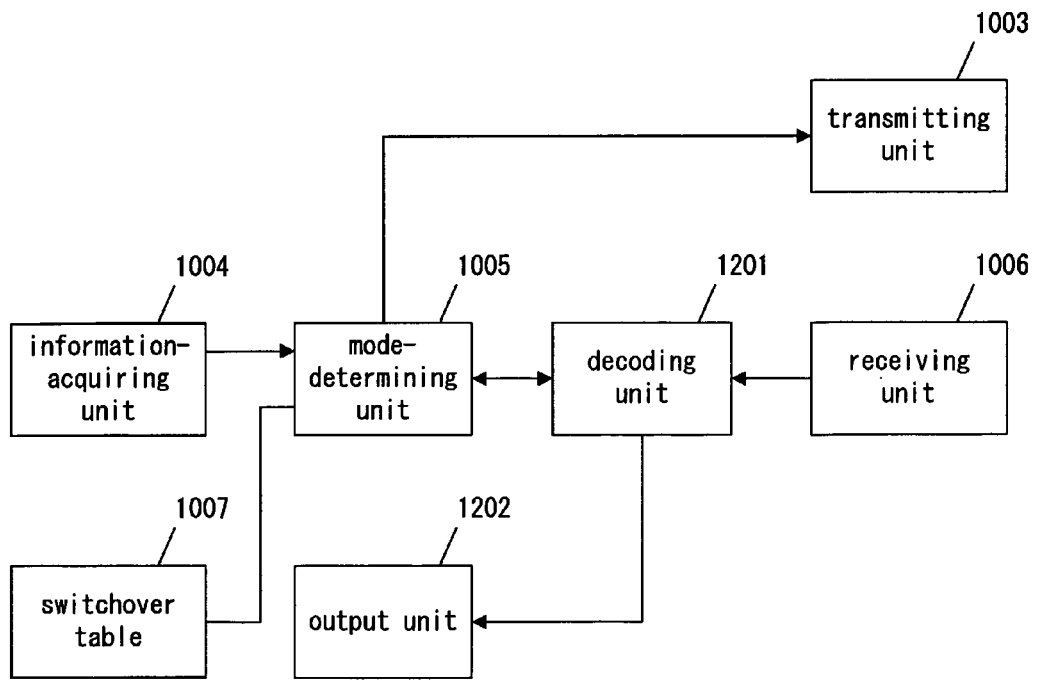
FIG. 2 is a block diagram illustrating a portable terminal according to a second embodiment.

FIG. 2 is a block diagram illustrating a portable terminal according to a second embodiment. In FIG. 2, elements similar to those of FIG. 1 are identified by the same reference characters, and descriptions related thereto are herein omitted. The following discusses differences between the present embodiment and the previous embodiment.

A decoding unit 1201 is operable to decode data received by a receiving unit 1006. The decoded image data is converted from YUV data into RGB data before being fed into an output unit 1202. The output unit 1202 includes a display unit, on which the decoded images are reproduced.

The decoding unit 1201 is operable to acquire communication counterpart system information from the data received by the receiving unit 1006. The system information as herein discussed is the same as that according to the previous embodiment.

For example, when the encoding method is MPEG-4 AVC, the syntax "NAL unit" defines the 5-bit "nal_unit_type", but non-stipulates "nal_unit_type=24" to "nal_unit_type=31". These non-stipulated character strings may be used as the system information according to the present embodiment.

A mode-determining unit 1005 is operable to determine an encoding method for the communication counterpart in accordance with the system information on each of the self-terminal and the communication counterpart. This means that a decoding method for the self-terminal is determined.

Pursuant to the present embodiment, one portable terminal in a decoding mode can determine an encoding method for a communication counterpart, and a mode of another portable terminal to encode images can be determined with a reduced processing amount. Furthermore, each conventional portable terminal can employ the art according to the present invention without a considerable change in structure of the conventional portable terminal.

Third Embodiment

Figure 3:
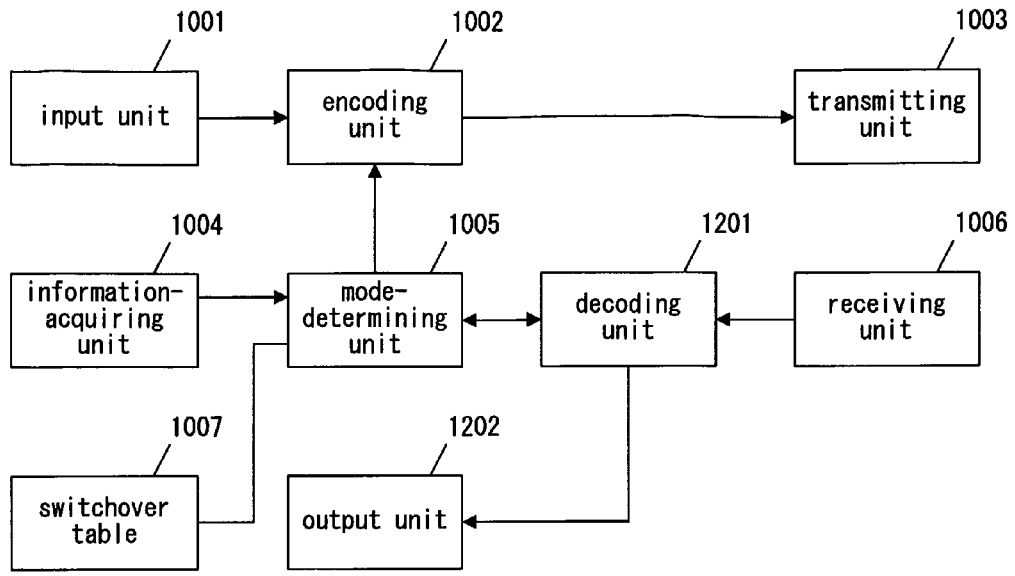
FIG. 3 is a block diagram illustrating a portable terminal according to a third embodiment.

FIG. 3 is a block diagram illustrating a portable terminal according to a third embodiment. In FIG. 3, elements similar to those of FIGS. 1 and 2 are identified by the same reference characters, and descriptions related thereto are herein omitted. The following discusses differences between the present embodiment and the first and second embodiments.

The present embodiment is premised on a videophone system operable to allow moving images to be received and transmitted between a self-terminal and its communication counterpart. In the videophone system, each of the portable terminals is operable to simultaneously execute both encoding and decoding processes.

A receiving unit 1006 is operable to receive data. A decoding unit 1201 is operable to decode the received data, thereby providing image data. The image data is reproduced on an output unit 1202. At the same time, the decoding unit 1201 is operable to acquire system information on the communication counterpart. The acquired communication counterpart system information is fed into a mode-determining unit 1005. An information-acquiring unit 1004 is operable to acquire system information on the self-terminal. The acquired self-terminal system information is fed into the mode-determining unit 1005 as well.

The mode-determining unit 1005 is operable to determine an encoding method to be used, based on the system information on each of the self-terminal and the communication counterpart, and operable to advise an encoding unit 1002 of the determined encoding method. The encoding method is determined in a manner similar to that according to the first embodiment.

The encoding unit 1002 is operable to encode each image entering through an input unit 1001, in accordance with the encoding method to be used. The encoded image data forms an encoded stream. The encoded stream is transmitted to the communication counterpart through a transmitting unit 1003.

The encoding unit 1002 is operable to feed the acquired self-terminal system information from the information-acquiring unit 1004 into the transmitting unit 1003, together with the encoded stream. The self-terminal system information is contained in a manner as discussed in the previous embodiment.

Pursuant to the present embodiment, in each of the portable terminals, such as the videophone system, operable to execute both of the encoding and decoding processes in parallel, the mode-determining unit 1005 determines the encoding method based on both of the self-terminal system information and the communication counterpart system information. This means that this type of portable terminal similarly determines the encoding method in light of a status of each of the self-terminal and the communication counterpart, whereby each of the portable terminals consumes reduced electrical power.

Fourth Embodiment

Figure 6:
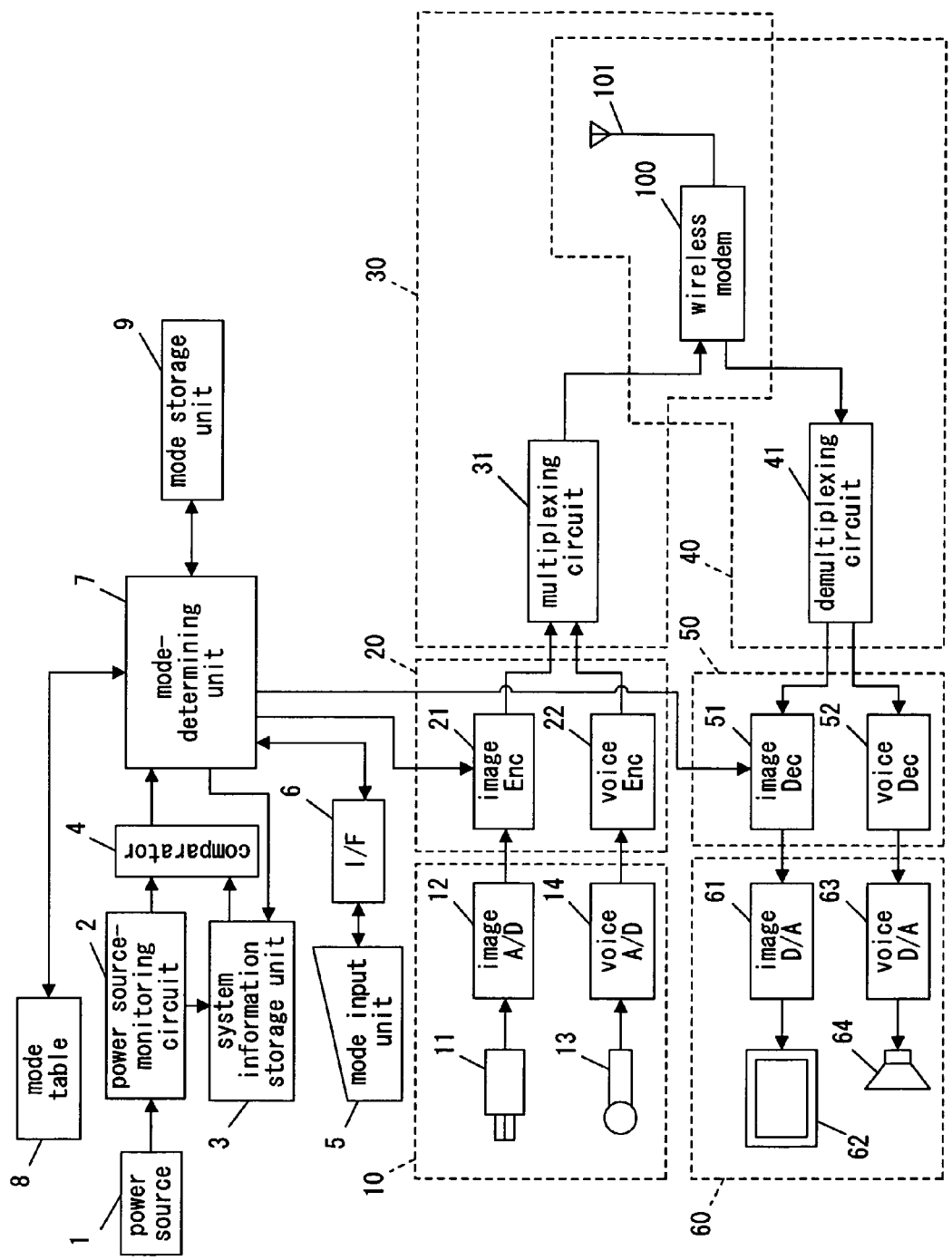
FIG. 6 is a block diagram illustrating a portable terminal according to a fourth embodiment.
Figure 8:
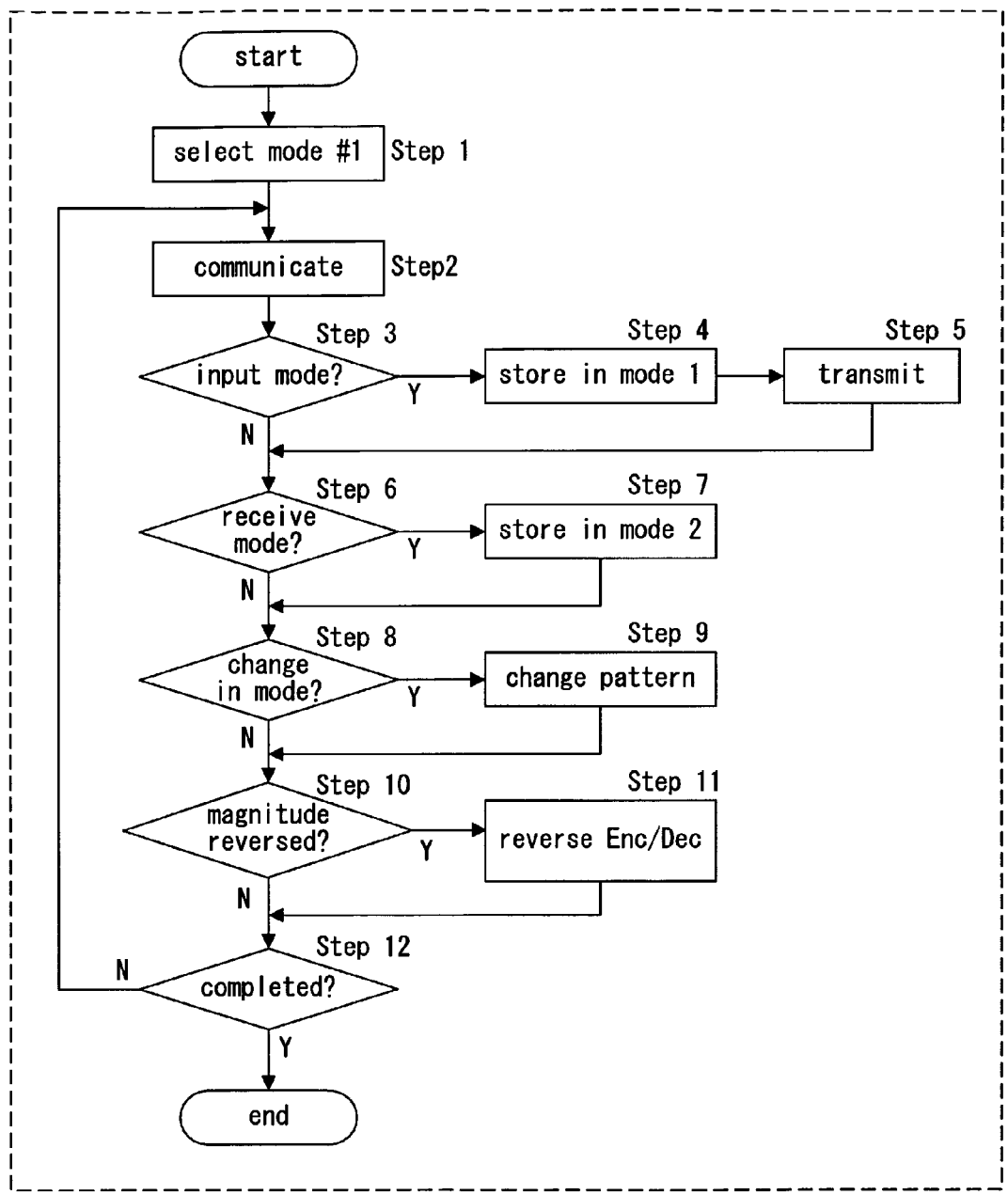
FIG. 8 is a flowchart illustrating a course of action provided by the portable terminal according to the fourth embodiment.

The following describes a portable terminal according to a fourth embodiment with reference to FIGS. 6-11. FIG. 6 is a block diagram illustrating the portable terminal.

As illustrated in FIG. 6, the portable terminal according to the present embodiment includes elements as discussed below. The present embodiment is presumed on that a self-terminal and its communication counterpart are each constructed as illustrated in FIG. 6.

A power source 1 includes a battery. A power source-monitoring circuit 2 at the next stage is operable to monitor the remaining power of the battery, and operable to feed results from the monitoring into a comparing unit 4 through either one of input terminals thereof.

A system information storage unit 3 is operable to store system information on each of the self-terminal and the communication counterpart, including remaining battery power thereof, and operable to feed the remaining battery power of the communication counterpart into the comparing unit 4 through the other input terminal thereof. The comparing unit 4 is operable to compare the remaining battery power between the self-terminal and the communication counterpart, thereby feeding results from the comparison into a mode-determining unit 7.

A mode input unit 5 includes a key set operable to receive user-operated input. In particular, users can enter any desired image quality mode ("XP" for high image quality, "LP" for standard image quality, and "SP" for low image quality) using the mode input unit 5. A display screen for the input of the user-desired image quality mode is arbitrarily configurable. The input entered into the mode input unit 5 is delivered to the mode-determining unit 7 through an interface 6.

A mode table 8 stores two different pieces of information as illustrated in FIG. 7(*a*) and FIG. 7(*b*). The information of FIG. 7(*a*) includes, for each mode (#1 to #4), a set of image quality, encoding-required power consumption, and decoding-required power consumption. The information of FIG. 7(*b*) includes a sum of power consumption values for each of patterns (#1, #1) to (#4, #4). Each of the patterns (#1, #1) to (#4, #4) contains a set of two modes selected from among the modes #1 to #4.

In FIG. 7(*a*), mode #1 is concerned with the high image quality (XP), and the selection of mode #1 provides a maximum sum of the encoding-required power consumption and the decoding-required power consumption in each of the portable terminals.

Each of mode #2 and mode #3 is concerned with the standard image quality (LP). In mode #2, the decoding-required power consumption is greater than the encoding-required power consumption. In mode #3, the decoding-required power consumption is smaller than the encoding-required power consumption. Based on such a magnitude relationship, the mode-determining unit 7 uses either mode #2 or mode #3 in the same standard image quality (LP), depending upon each situation demand, as discussed later in detail.

As illustrated in FIG. 7(*b*), when both of the self-terminal and the communication counterpart select mode #1 (i.e., pattern (#1, #1)), a sum of power consumption results in the maximum value "1000". With continued reference to FIG. 7(*b*), when both of the self-terminal and the communication counterpart select mode #4 (i.e., pattern (#4, #4)), a sum of power consumption results in the minimum value "260".

For remaining patterns between the patterns (#1, #1) and (#4, #4), a sum of power consumption for each of the remaining patterns results in an intermediate value between the patterns (#1, #1) and (#4, #4). As amplified later, the mode-determining unit 7 selects a pattern from among the patterns (#1, #1) to (#4, #4) so as to provide a minimum sum of power consumption, provided that the selected pattern satisfies required image quality. Although the mode-determining unit of each of the self-terminal and the communication counterpart is operable to differentiate a pattern (#A, #B) from a reverse pattern (#B, #A), a sum of power consumption for either one of the patterns (#A, #B) and (#B, #A) is equal to that for the other pattern. Thus, to avoid double description, the patterns (#A, #B) and (#B, #A) are contained in FIG. 7(b) without being differentiated from one another.

A mode storage unit 9 is operable to store information on the current mode determined by the mode-determining unit 7.

An input unit 10 includes a camera 11 and a microphone 13, through which images and voices enter the input unit 10. The output from the camera 11 is converted by an image A/D converter 12 into digital image signals. The output from the microphone 13 is converted by a voice A/D converter 14 into digital voice signals.

An encoding unit 20 includes an image encoder 21 and a voice encoder 22. The image encoder 21 is operable to encode the output from the image A/D converter 12 in accordance with an encoding method instructed by the mode-determining unit 7, thereby feeding the encoded output into a multiplexing circuit 31 through one of input terminals thereof The voice encoder 22 is operable to encode the output from the voice A/D converter 14 in accordance with the encoding method instructed by the mode-determining unit 7, thereby feeding the encoded output into the multiplexing circuit 31 through the other input terminal thereof A transmitting unit 30 includes elements as given below. The multiplexing circuit 31 is operable to multiplex the output from each of the image encoder 21 and the voice encoder 22. A wireless modem 100 is operable to modulate the output from the multiplexing circuit 31, thereby transmitting the modulated output to the communication counterpart through an antenna 101.

A receiving unit 40 includes elements as discussed below. The wireless modem 100 is operable to demodulate signals received by the antenna 101, thereby generating encoded data. A demultiplexing circuit 41 is operable to demultiplex the demodulated data, thereby separating the data between image and voice encoded data, and operable to feed the image encoded data and the voice encoded data into an image decoder 51 and a voice decoder 52, respectively.

A decoding unit 50 includes the image decoder 51 and the voice decoder 52. The image decoder 51 is operable to decode the image output from the demultiplexing circuit 41 in accordance with a decoding method instructed by the mode-determining unit 7, thereby generating image data, and operable to feed the image data into an image D/A converter 61. The voice decoder 52 is operable to decode the voice output from the demultiplexing circuit 41 in accordance with the decoding method instructed by the mode-determining unit 7, thereby generating voice data, and operable to feed the voice data into an voice D/A converter 63.

An output unit 60 includes a display unit 62 and a speaker 64 to reproduce images and voices, respectively. The output from the image decoder 51 is converted by the image D/A converter 61 into analog image signals, thereby supplying the display unit 62 with the analog image signals. As a result, images are displayed on the display unit 62. The output from the voice decoder 52 is converted by the voice D/A converter 63 into analog voice signals, thereby supplying the speaker 64 with the analog voice signals. As a result, the speaker 64 reproduces voices.

The following discusses a course of action provided by the mode-determining unit 7, with reference to FIGS. 8-11. At initial step 1, the mode-determining unit 7 selects the pattern (#1, #1) as a default pattern before communication is started between the self-terminal and the communication counterpart.

Figure 9:
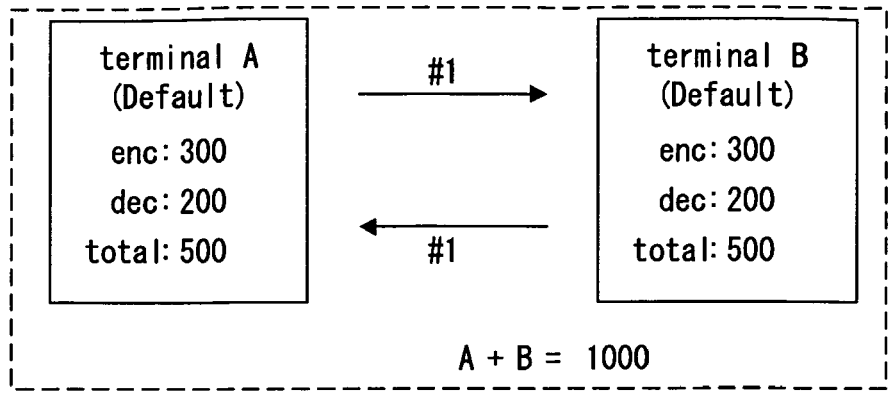
FIG. 9 is a descriptive illustration showing one communication status according to the fourth embodiment.

As a result, as illustrated in FIG. 9, at step 2, the communication is started between the self-terminal (terminal "A") in the mode #1 and the communication counterpart (terminal "B") in the mode #1. At this time, an encoding-required power consumption value is "300", a decoding-required power consumption value is "200", and a total power consumption value required by each of the portable terminals is "500". Accordingly, a total power consumption value required by both of the self-terminal and the communication counterpart is "1000".

The above step is taken in light of that the remaining battery power of each of the self-terminal and the communication counterpart is predicted to be at the highest level immediately after the start of the communication therebetween, and in light of that communication having as good image quality as possible is preferably made, except as otherwise particularly instructed by users. Following the above step, the prior art exercises no control over power consumption until the remaining battery power reduces to a very small degree. In contrast, according to the present embodiment, even when the remaining battery power is relatively rich as just discussed above, the encoding/decoding methods are properly changed as discussed below. As a result, communication between the self-terminal and the communication counterpart can be made for a longer period of time.

Referring back to FIG. 8, at step 3, the mode-determining unit 7 self-checks to determine whether a user has entered an image quality mode into the mode-determining unit 7 through the mode input unit 5. When the determination in step 3 results in "YES", then at step 4, the mode storage unit 9 stores the user-entered image quality mode as mode 1. At step 5, the user-entered image quality mode is transmitted to the communication counterpart.

At step 6, the mode-determining unit 7 self-checks to determine whether an image quality mode has been received from the communication counterpart. When the determination in step 6 results in "YES", then at step 7, the mode storage unit 9 stores the received image quality mode as mode 2.

At step 8, the mode-determining unit 7 checks the mode storage unit 9 to determine whether there is a change in modes 1 and 2 stored therein. When the determination in step 8 results in "YES", the mode-determining unit 7 selects a proper pattern, as discussed below, from among the patterns of FIG. 7(b).

The mode-determining unit 7 determines, based on image quality request information, both of the encoding method for the encoding unit and the decoding method for the decoding unit so as to provide reduced power consumption. More specifically, the mode-determining unit 7 determines both of the encoding method for the encoding unit and the decoding method for the decoding unit with reference to a sum of the power consumption of the self-terminal and the power consumption of the communication counterpart so as to provide an as small sum as possible.

Figure 10:
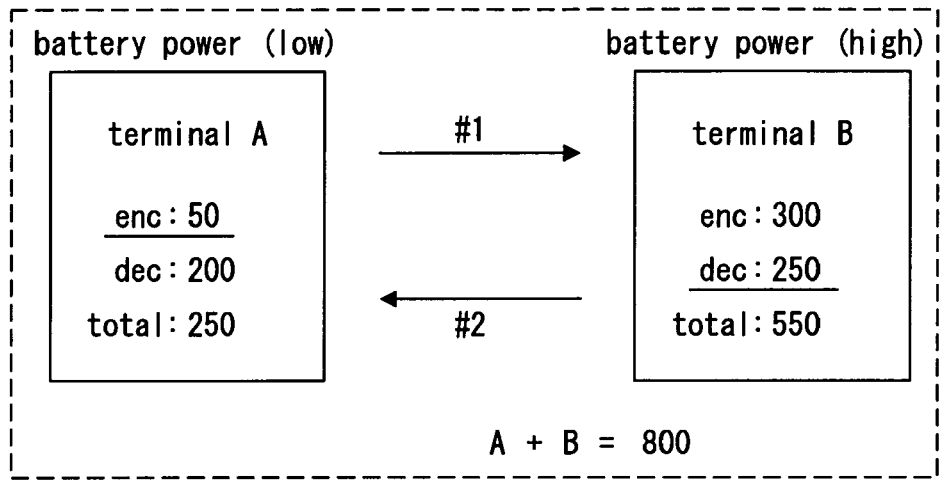
FIG. 10 is a descriptive illustration showing another communication status according to the fourth embodiment.

For example, as illustrated in FIG. 10, assuming that a user of the communication counterpart (terminal "B") transmits, to the self-terminal, image quality request information saying that "mode #2 is good enough", the mode-determining unit 7 of the self-terminal (terminal "A") provides a switchover from the pattern (#1, #1) to the pattern (#1, #2) because the total power consumption value "800" for the pattern (#1, #2) is smaller than the total power consumption value "1000" for the pattern (#1, #1). As a result, the encoding-required power consumption in the self-terminal (terminal "A") is changed in value from "300" to "50", and a total power consumption value of the self-terminal (terminal "A") results in "250".

The encoding and decoding processes in the communication counterpart (terminal "B") are reverse in position when viewed from the self-terminal (terminal "A"). The mode-determining unit 7 of the communication counterpart provides a switchover from the pattern (#1, #1) to the pattern (#1, #2), and the decoding-required power consumption in the communication counterpart (terminal "B") is changed in value from "200" to "250".

As a result, the self-terminal (terminal "A") is smaller in total power consumption value than the communication counterpart (terminal "B"). This relationship is particularly preferred when the self-terminal (terminal "A") has a lower level of remaining battery power, but the communication counterpart (terminal "B") has a higher level of remaining battery power.

However, when such a status continues, there is likelihood that the magnitude relationship of the remaining battery power between the self-terminal (terminal "A") and the communication counterpart (terminal "B") may be reversed in course of time.

Figure 11:
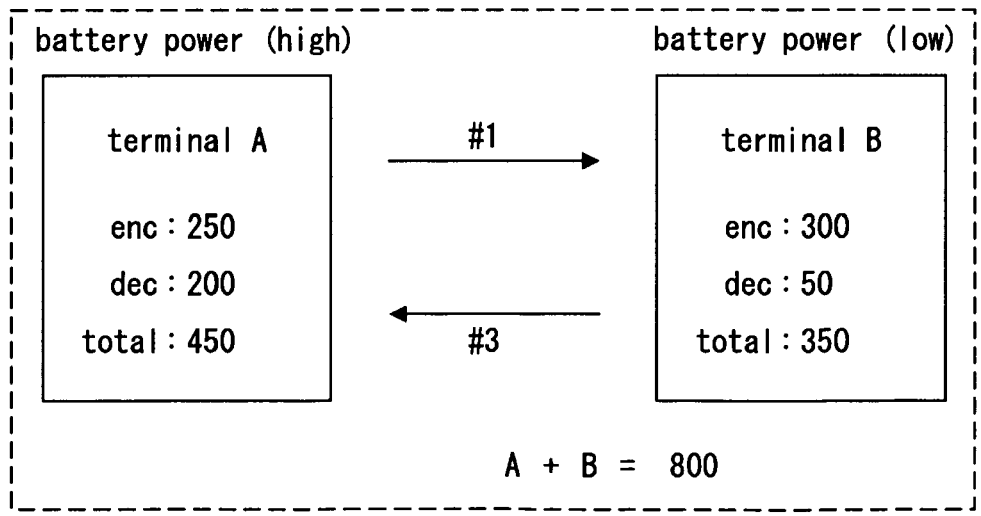
FIG. 11 is a descriptive illustration showing a further communication status according to the fourth embodiment.
Figure 12:
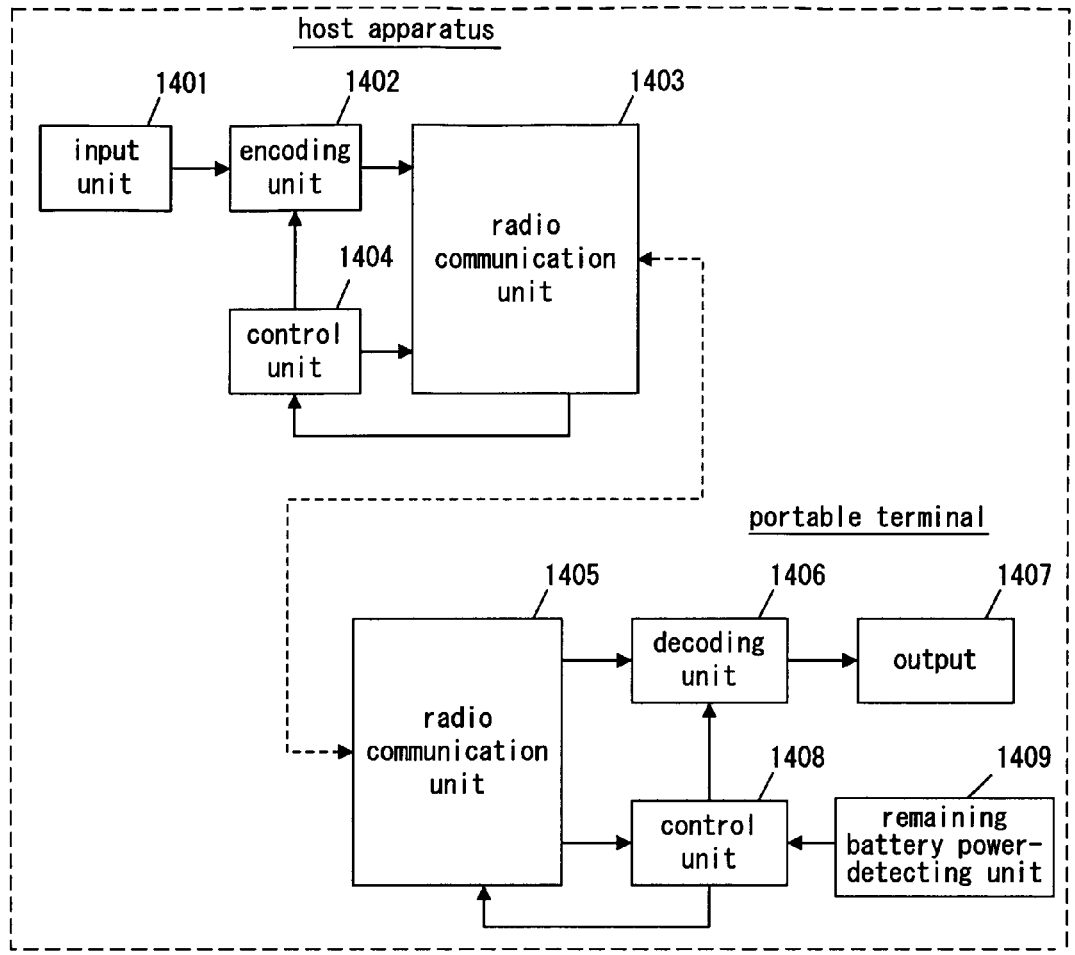
FIG. 12 is a block diagram illustrating a prior art image-transmitting/receiving system.
Figure 13:
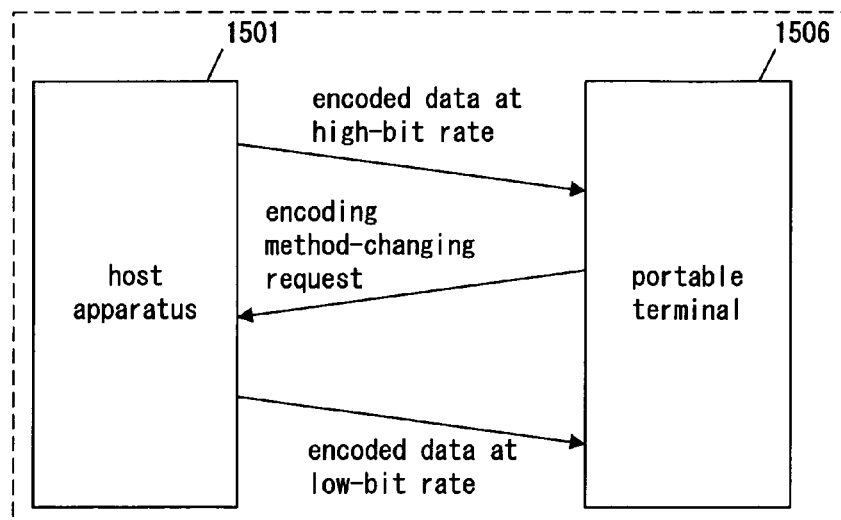
FIG. 13 is a descriptive illustration showing data communication made by the prior art image-transmitting/receiving system.

Thus, at step 10, the mode-determining unit 7 checks the output from the comparing unit 4 to determine whether the magnitude relationship of the remaining battery power has been reversed. When the determination in step 10 results in "YES", then at step 11, as illustrated in FIG. 11, the mode-determining unit 7 of each of the self-terminal (terminal "A") and the communication counterpart (terminal "B") changes the pattern so as to provide a switchover of each of the encoding and decoding processes, but maintains the current image quality unchanged. The pattern change of FIG. 11 is coincident with a result achieved when image quality request information saying that "mode #3 is good enough" is transmitted from the communication counterpart (terminal "B") to the self-terminal (terminal "A").

At any rate, the current image quality remains unchanged, and it is therefore believed that no unpleasant feelings would be shared by users. In addition, a power consumption-related, lighter burden is imposed on the terminal having a further smaller level of remaining battery power, and communication between the self-terminal (terminal "A") and the communication counterpart (terminal "B") can be made totally for a longer period of time.

As described above, pursuant to the present embodiment, the transmitting unit 30 transmits, to the communication counterpart, the system information on the remaining battery power of the self-terminal, while the receiving unit 40 receives, from the communication counterpart, the system information on the remaining battery power of the communication counterpart.

Pursuant to the present embodiment, when the magnitude relationship of the remaining battery power between the self-terminal and the communication counterpart is reversed, then the mode-determining unit 7 changes at least one of the encoding method for the encoding unit 20 and the decoding method for the decoding unit 50 so as to provide reduced power consumption in either one of the self-terminal and the communication counterpart, whichever is lower in remaining battery power.

At step 12, the mode-determining unit 7 repeats a flow of processing from step 2 to step 11, as circumstances demand.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

INDUSTRIAL APPLICABILITY

The portable terminal according to the present invention finds desirable applications in the field of, e.g., a videophone system using a battery-driven portable terminal, or in the field of arts related thereto.

The invention claimed is:

1. A portable terminal comprising:
   an input unit, through which an image is entered;
   an encoding unit operable to encode the image in accordance with one of a plurality of encoding methods, thereby generating data;
   a transmitting unit operable to transmit the data to a communication counterpart;
   a receiving unit operable to receive image quality request information from the communication counterpart; and
   a mode-determining unit operable to determine one from among the plurality of encoding methods in accordance with the image quality request information so as to provide reduced power consumption, thereby providing a determined encoding method, whereby said encoding unit encodes the image in accordance with the determined encoding method;
   wherein said mode-determining unit determines the encoding method for said encoding unit with reference to a sum of power consumption of said portable terminal and power consumption in the communication counterpart, so as to allow the sum to be as small as possible.

2. A portable terminal comprising:
   a receiving unit operable to receive both image quality request information and encoded data from a communication counterpart;
   a decoding unit operable to decode the encoded data in accordance with one of a plurality of decoding methods, thereby generating an image;
   an output unit, through which the image is provided; and
   a mode-determining unit operable to determine one from among the plurality of decoding methods in accordance with the image quality request information so as to provide reduced power consumption, thereby providing a determined decoding method, whereby said decoding unit decodes the encoded data in accordance with the determined decoding method;
   wherein said mode-determining unit determines the decoding method for said decoding unit with reference to a sum of power consumption of said portable terminal and power consumption in the communication counterpart, so as to allow the sum to be as small as possible.

3. A portable terminal comprising:
   an input unit, through which an image is entered;
   an encoding unit operable to encode the image in accordance with one of a plurality of encoding methods, thereby generating data;
   a transmitting unit operable to transmit the data to a communication counterpart;
   a receiving unit operable to receive both image quality request information and encoded data from the communication counterpart;
   a decoding unit operable to decode the encoded data in accordance with one of a plurality of decoding methods, thereby providing a generated image;
   an output unit, through which the generated image is provided; and
   a mode-determining unit operable to determine one from among the plurality of encoding methods in accordance with the image quality request information so as to provide reduced power consumption, thereby providing a determined encoding method, whereby said encoding unit encodes the image in accordance with the determined encoding method, wherein said mode-determining unit determines one from among the plurality of decoding methods in accordance with the image quality request information so as to provide reduced power consumption, thereby providing a determined decoding method, whereby said decoding unit decodes the encoded data in accordance with the determined decoding method;

wherein said mode-determining unit determines each of the encoding method for said encoding unit and the decoding method for said decoding unit, with reference to a sum of power consumption of said portable terminal and power consumption in the communication counterpart, so as to allow the sum to be as small as possible.

4. A portable terminal as defined in claim 3, wherein said transmitting unit transmits system information to a communication counterpart, the system information being indicative of remaining battery power of said portable terminal, while said receiving unit receives system information from the communication counterpart, the system information being indicative of remaining battery power of the communication counterpart, and wherein when a magnitude relationship of the remaining battery power between said portable terminal and the communication counterpart is reversed, said mode-determining unit changes at least one of the encoding method for said encoding unit and the decoding method for said decoding unit so as to provide reduced power consumption in one of said portable terminal and the communication counterpart, whichever is smaller in remaining battery power.

5. A portable terminal as defined in claim 3, wherein the image quality request information shows high, standard, and low levels of image quality.

6. A portable terminal as defined in claim 3, wherein said mode-determining unit determines a change in encoding method for said encoding unit, and wherein when said encoding unit is encoding the image, said mode-determining unit delays the change in encoding method for said encoding unit until said encoding unit completes encoding the image.

7. A portable terminal as defined in claim 3, wherein said mode-determining unit determines a change in decoding method for said decoding unit, and wherein when said decoding unit is decoding the encoded data, said mode-determining unit delays the change in decoding method for said decoding unit until said decoding unit completes decoding the encoded data.

8. A semiconductor integrated circuit comprising:

an encoding unit operable to encode an input image in accordance with one of a plurality of encoding methods, thereby generating data;

a transmitting unit operable to transmit the data to a communication counterpart;

a receiving unit operable to receive both image quality request information and encoded data from the communication counterpart;

a decoding unit operable to decode the encoded data in accordance with one of a plurality of decoding methods, thereby generating an image; and a mode-determining unit operable to determine one from among the plurality of encoding methods in accordance with the image quality request information so as to provide reduced power consumption, thereby providing a determined encoding method, whereby said encoding unit encodes the image in accordance with the determined encoding method, wherein said mode-determining unit determines one from among the plurality of decoding methods in accordance with the image quality request information so as to provide reduced power consumption, thereby providing a determined decoding method, whereby said decoding unit decodes the encoded data in accordance with the determined decoding method;

wherein said mode-determining unit determines each of the encoding method for said encoding unit and the decoding method for said decoding unit, with reference to a sum of power consumption of said portable terminal and power consumption in the communication counterpart, so as to allow the sum to be as small as possible.

* * * * *